United States Patent [19]

Walker et al.

[11] Patent Number: 5,120,785
[45] Date of Patent: Jun. 9, 1992

[54] ETHYLENE VINYL ACETATE POLYMERS FOR LATEX CAULKS

[75] Inventors: James L. Walker, Whitehouse Station; Paul R. Mudge, Belle Mead, both of N.J.

[73] Assignee: National Starch and Chemical Investment Holding Corporation, Wilmington, Del.

[21] Appl. No.: 264,102

[22] Filed: Oct. 28, 1988

[51] Int. Cl.⁵ .............................................. C08K 3/30
[52] U.S. Cl. .................................... 524/423; 524/425; 524/436; 524/445; 524/446; 524/448; 524/449; 524/451; 524/555
[58] Field of Search ............... 524/555, 425, 446, 451, 524/448, 449, 423, 445, 436

[56] References Cited

U.S. PATENT DOCUMENTS

| | | | |
|---|---|---|---|
| 3,919,146 | 11/1975 | Emmons | 260/23 EP |
| 4,044,197 | 8/1977 | Wiest et al. | 526/304 |
| 4,277,387 | 7/1981 | Jordan et al. | 260/29.7 H |
| 4,322,516 | 3/1982 | Wiest et al. | 526/307.7 |
| 4,340,524 | 7/1982 | Bullman | 524/297 |
| 4,610,920 | 9/1986 | Mudge et al. | 428/288 |
| 4,692,366 | 9/1987 | Mudge | 428/90 |
| 4,702,957 | 10/1987 | Mudge | 428/288 |
| 4,737,386 | 4/1988 | Wotier et al. | 427/389.9 |
| 4,740,394 | 4/1988 | Mudge | 427/389.9 |
| 4,742,107 | 5/1988 | Statz | 524/425 X |
| 4,749,731 | 6/1988 | Kyminas | 524/425 X |
| 4,753,846 | 6/1988 | Mudge | 428/343 |
| 4,806,590 | 2/1989 | Padget et al. | 524/425 X |
| 4,845,152 | 7/1989 | Palmer | 524/425 X |
| 4,859,723 | 8/1989 | Kyminas et al. | 524/425 X |

OTHER PUBLICATIONS

Emulsion Polymers for Caulks and Sealants by Joseph G. Palmer.
Reed, D. H., New Latex for Caulks and Sealants, American Paint Journal, Oct. 19, 1970.

Primary Examiner—Joseph L. Schofer
Assistant Examiner—J. M. Reddick
Attorney, Agent, or Firm—Ellen T. Dec

[57] ABSTRACT

Latex caulk compositions comprising 30 to 80% filler and 20 to 70% by weight of an emulsion polymer prepared for the interpolymerization of 30 to 70 parts by weight of a vinyl ester of an alkanoic acid; 15 to 60 parts of an alkyl ($C_2$ and $C_8$) acrylate or dialkyl ($C_2$ to $C_{10}$) maleate; 10 to 30 parts ethylene; 1 to 5 parts olefinically unsaturated carboxylic acid; 0 to 5 parts polyolefinically unsaturated monomer and 0 to 8 parts of a copolymerizable functional monomer containing hydroxyl, amide or methylol substituents, (to total 100 parts by weight).

11 Claims, No Drawings

ETHYLENE VINYL ACETATE POLYMERS FOR LATEX CAULKS

Caulks or sealants perform by bridging gaps between two neighboring materials and providing a barrier to the passage of gas, liquid or heat through the gap. The primary uses of latex caulks and sealants are in residential housing and in some commercial construction. In these applications the substrates are most often wood, aluminum, glass and vinyl. In order to perform adequately, the caulk must adhere to both substrates and be able to absorb dimensional changes without losing its barrier properties. The caulk provides a barrier to water entering the building and from air passing out. In exterior uses, stress results from expansion and contraction of the structure as temperatures change. A latex caulk that cannot absorb this stress because it is too brittle will fail by losing adhesion or by cracking. A latex caulk that is too soft may absorb the stress initially but on repeated cycles of contraction and expansion will not be able to recover its original dimension. Eventually holes or cracks will form.

The caulks are generally prepared by dispersing relatively large quantities of fillers and/or pigments in acrylic emulsion polymers which serve as coating vehicles for the pigments and, after evaporation of the water and curing, as binders therefor.

The performance of a caulk for expansion/contraction and recovery are largely dependent on the polymer used as the caulk base. Emulsion polymers have been used as the base in caulking applications for over 30 years. During this time the performance of latex caulks has been continually improved through development of new polymers and refinements in formulation.

The original latex caulks used polyvinyl acetate emulsions that had been designed for adhesive and coatings applications. While the polymers were relatively brittle and water sensitive, they could be formulated to make reasonably good, low cost, interior caulks. Copolymers of vinyl acetate followed and brought improved durability and permanent flexibility.

Acrylic latex for caulks was introduced about 20 years ago providing another jump in performance, especially where exterior weatherability and elastomeric properties are desired. Recent attempts have been made to achieve these properties using lower cost emulsion as the binder component.

We have now found that performance properties comparable to the allacrylic copolymers can be obtained using, as the caulk base, polymers prepared from the interpolymerization of 30 to 70 parts by weight of a vinyl ester of an alkanoic acid; 15 to 60 parts of an alkyl ($C_2$ to $C_8$) acrylate or dialkyl ($C_2$ to $C_{10}$) maleate; 10 to 30 parts ethylene; 1 to 5 parts olefinically unsaturated carboxylic acid; 0 to 5 parts multi-functional monomer and 0 to 8 parts of a copolymerizable functional monomer containing hydroxyl, amide or methylol substituents, (to total 100 parts by weight).

The vinyl esters utilized herein are the esters of alkanoic acids having from one to about 13 carbon atoms. Typical examples include; vinyl formate, vinyl acetate, vinyl propionate, vinyl butyrate, vinyl isobutyrate, vinyl valerate, vinyl 2-ethyl-hexanoate, vinyl isooctanoate, vinyl nonoate, vinyl decanoate, vinyl pivalate, vinyl versatate, etc. Of the foregoing, vinyl acetate is the preferred monomer because of its ready availability and low cost. The vinyl ester is used in an amount of 30 to 70% by weight preferably 50 to 60%.

The alkyl acrylates used herein are those containing 2 to 8 carbon atoms in the alkyl group and include ethyl, butyl, hexyl, 2-ethyl hexyl and octyl acrylate. The corresponding methacrylates may also be used herein as may mixtures of any of the above.

The dialkyl maleate monomers used herein include the $C_2$ to $C_{10}$ dialkyl maleates such as di-2-ethyhexyl maleate, di-n-octyl maleate, di-iso-octyl maleate, dimethylamyl maleate, di-butyl maleate and di-iso-decyl maleate. Particularly preferred are the $C_4$-$C_{10}$ dialkyl maleates and more particularly the $C_8$ dialkyl maleates. Due to its commerical availability di-2-ethylhexyl maleate is most generally used. Since, after polymerization, the structure of the fumarate and maleate (cis and trans isomers) are the same, the corresponding fumarate esters are also contemplated for use herein.

The particular alkyl acrylate or dialkyl maleate chosen, as well as the amounts employed, will vary depending upon the Tg and performance properties desired in the particular caulk application. In general, this component is used at levels of 20 to 60% by weight of the polymer (solids), preferably 25 to 40%.

The olefinically-unsaturated carboxylic acids used herein, are the alkenoic acids having from 3 to 6 carbon atoms, like acrylic acid, methacrylic acid, crotonic acid, itaconic acid, maleic acid or fumaric acid, or mixtures thereof in amounts sufficient to provide 1 to 5% by weight, preferably 1 to 3.5 of monomer units in the final polymer.

Optionally, polyunsaturated copolymerizable monomers may also be present in small amounts, i.e., up to about 5% by weight. Such comonomers would include those polyolefinically-unsaturated monomers copolymerizable with vinyl acetate and ethylene, such as lower alkenyl lower alkenoates, for example, vinyl crotonate, allyl acrylate, allyl methacrylate; di-lower alkenyl alkanedioates, for example, diallyl maleate, divinyl adipate, diallyl adipate; dilower alkenyl benzenedicarboxylates, for example, diallyl phthalate; lower alkanediol di-lower alkenoates, for example, ethylene glycol diacrylate, ethylene glycol dimethacrylate, butanediol dimethacrylate; lower alkylene bis-acrylamides and lower alkylene bismethacrylamides, for example, methylene bis-acrylamide; triallyl cyanurate, etc. In addition, certain copolymerizable monomers which assist in the stability of the copolymer emulsion, e.g., 2-acrylamide-2-methylpropane sulfonic acid and vinyl sulfonic acid, are also useful herein as latex stabilizers. These optionally present monomers, if employed, are added in very low amounts of from 0.1 to 2% by weight of the monomer mixture.

The other polymerizable comonomers which are also preferably employed in the polymer include, in particular, those comonomers containing hydroxyl, methylol or amide functionality such as N-methylol, acrylamide or methacrylamide, acrylamide, hydroxyalkyl ($C_2$-$C_4$) acrylates or methacrylates, etc. The monomers provide specific adhesion and/or binding properties and, if present, are used in amounts of 1 to 8% by weight, preferably 1 to 2%.

Conventional batch, semi-batch or continuous emulsion polymerization procedures may be utilized to produce the latices described herein. Generally, the monomers are polymerized in an aqueous medium under pressures not exceeding 100 atmospheres in the presence of a catalyst and at least one emulsifing agent. It is preferred that a semi-batch polymerization procedure be employed.

The quantity of ethylene entering into the copolymer is influenced by the pressure, the agitation, and the viscosity of the polymerization medium. Thus, to increase the ethylene content of the copolymer, higher pressures are employed. A pressure of at least about 10 atmospheres is most suitable employed. The mixture is thoroughly agitated to dissolve the ethylene, agitation being continued until substantial equilibrim is achieved. This generally requires about 15 minutes; however, less time may be required depending upon the vessel, the efficiency of agitation, the specific system, and the like.

Suitable as polymerization catalysts are the water-soluble free-radical-formers generally used in emulsion polymerization, such as hydrogen peroxide, sodium persulfate, potassium persulfate and ammonium persulfate, as well as tert-butyl hydroperoxide, in amounts of between 0.01 and 3% by weight, preferably 0.01 and 1% by weight based on the total amount of the emulsion. They can be used alone or together with reducing agents such as sodium formaldehyde-sulfoxylate, iron-II-salts, sodium dithionite, sodium hydrogen sulfite, sodium sulfite, sodium thiosulfate, as redox catalysts in amounts of 0.01 to 3% by weight, preferably 0.01 to 1% by weight, based on the total amount of the emulsion. The free-radical-formers can be charged in the aqueous emulsifier solution or be added during the polymerization in doses.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkai metal phosphates. Polymerization regulators, like mercaptans, aldehydes, chloroform, methylene chloride and trichloroethylene, can also be added in some cases.

The dispersing agents are all the emulsifiers generally used in emulsion polymerization, as well as optionally present protective colloids. It is also possible to use emulsifiers alone or in mixtures with protective colloids.

The emulsifier can be anionic, cationic or nonionic surface active compounds. Suitable anionic emulsifiers are, for example, alkyl sulfonates, alkylaryl sulfonates, alkyl sulfates, sulfates of hydroxylalkanols, alkyl and alkylaryl disulfonates, sulfonated fatty acids, sulfates and phosphates of polyethoxylated alkanols and alkylphenols, as well as esters of sulfosuccinic acid. Suitable cationic emulsifiers are, for example, alkyl quaternary ammonium salts, and alkyl quaternary phosphonium salts. Examples of suitable non-ionic emulsifiers are the addition products of 5 to 50 mols of ethylene oxide adducted to straight-chained and branch-chained alkanols with 6 to 22 carbon atoms, or alkylphenols, or higher fatty acids, or higher fatty acid amides, or primary and secondary higher alkyl amines; as well as block copolymers of propylene oxide with ethylene oxide and mixtures thereof. When combinations of emulsifying agents are used, it is advantageous to use a relatively hydrophobic emulsifying agent in combination with a relatively hydrophilic agent. The amount of emulsifying agent is generally from about 1 to 10 preferably from about 2 to about 8, weight percent of the monomers used in the polymerization.

The emulsifier used in the polymerization can also be added in its entirety to the initial charge to the polymerization zone or a portion of the emulsifier, e.g., from 25 to 90 percent thereof, can be added continuously or intermittently during polymerization.

Various protective colloids may also be used in place of or in addition to the emulsifiers described above. Suitable colloids include partially acetylated polyvinyl alcohol, e.g., up to 50 percent acetylated casein, hydroxyethyl starch, carboxymethyl cellulose, gum arabic, and the like, as known in the art of synthetic emulsion polymer technology. In general, these colloids are used at levels of 0.05 to 4% by weight based on the total emulsion.

The polymerization reaction is generally continued until the residual vinyl acetate monomer content is below about 1%. The completed reaction product is then allowed to cool to about room temperature, while sealed from the atmosphere.

The particle size of the latex can be regulated by the quantity of nonionic or anionic emulsifying agent or protective colloid employed, to obtain smaller particles sizes, greater amounts of emulsifying agents are used. As a general rule, the greater the amount of the emulsifying agent employed, the smaller the average particle size.

The polymer used herein should have a glass transition temperature of about $-40°$ to $0°$ C., preferably from about $-30°$ C. to about $-10°$ C. The polymer will be employed in the form of a latex having a solids content of from about 50 to about 65%, by weight, based on the weight of the latex.

The resulting polymer latex is preferably present in the caulk in an amount of from about 20 to about 70% by weight, the filler and other additives comprising the remainder of the composition. For purposes of econamy in applying and also to minimize shrinkage, it is desired to have as high a solids content as possible in the caulk.

The fillers or pigments, are present in an amount depending upon the consistency desired, the presence or absence of thickening agents, etc. Suitable inert fillers and pigments include calcite, limestone (calcium carbonate), mica, talc, asbestos fiber or powder, diatomaceous earth, barytes, alumina, slate flour, calcium silcate, clay, coloidal silica, magnesium carbonate, titanium dioxide, carbon black, iron oxide, chrome green, phthalocyanine blue, magnesium silicate, and so on.

The caulk of the present invention may also include other additives conventionally employed in caulks such as plasticizers, free-thaw stabilizers, drying oils, pigment dispersants, small amounts of solvents, anti-bacterial and/or anti-fungal preservatives, and agents for improving rheological properties such as thickeners and anti-slump agents. The plasticizer will generally be used in an amount of up to about 25% by weight and the other additives when present, will total up to about 3% by weight, based on the total weight of the composition. A plasticizer may be desirable to reduce the tack of the copolymer so that the caulk can have the desired tack-free time of less than 72 hours. The usual surfactants and emulsifiers commonly used in preparing or formulating latex polymers may be present. These include anionic, nonionic, and cationic materials.

It is helpful, in some cases, to utilize a silane to improve wet adhesion to glass by the caulk. The silane may be post-added to the caulk base or polymerized therein. Suitable silanes include vinyltriethoxysilane, γ-methacryloxypropyltrimethoxysilane, γ-mercaptopropyltrimethoxysilane, γ-glycidoxypropyltrimethoxysilane, β-(3,4-epoxycycyclohexyl)ethyltrimethoxysilane, γ-aminopropyltrietoxysilane, and N-(dimethoxymethylsilylisobutyl)ethylenediamine. The silane concentration may be between about 0.05 percent and 0.5 percent of the total caulking composition. Higher amounts may be used but do not result in proportional improvements in adhesion.

A base may also be present for example to neutralize carboxylic acid groups occuring in the elastomeric polymer. Suitable is a volatile base such as ammonia or a volatile water-soluble amine such as dimethylamine, triethylamine, triethanolamine, morpholine, N-methyl morpholine, picoline, and the like, as well as inorganic bases.

The caulk may be readily prepared using a conventional mixer, generally of the heavy duty type, followed by de-airing. Mixing and de-airing procedures are well known in the art.

Caulking compositions must be fluid enough as measured by consistency to be applied easily, and yet must not slump or flow to a great extent, after being applied to the substrate, nor shrink excessively upon drying or curing. An important compositional feature of caulks to give these properties is the solids content, "solids" being defined as the total materials present which are nonvolatile under ordinary conditions of use. For aqueous latex based caulking or sealing compositions according to the invention, the solids content is from about 65% to about 90% by weight, preferably about 75% to about 85% and more preferably from about 80% to about 85%. Solids content is kept as high as possible while yet achieving a useful consistency.

The following examples are given to illustrate the present invention, but it will be understood that they are intended to be illustrative only and not limitative of the invention. In the examples, all parts are by weight unless otherwise indicated.

A typical caulk formulation is as follows:

|  | Parts by Weight |
| --- | --- |
| Copolymer latex (58% N.V.) | 34.0 |
| Nonionic surfactant | 0.75 |
| Dispersant | 1.10 |
| Plasticizer | 8.0 |
| Antifreeze additive | 1.0 |
| Tooling agent | 2.0 |
| Water | 0.8 |
| Filler | 51.0 |
| Pigment | 1.0 |
| Defoamer | 0.15 |
| Adhesion Promoter | 0.5 |
| Total | 100.0 |

Example I

A 10 liter stainless steel autoclave equipped with heating/cooling means, variable rate stirrer and means of metering monomers and initiatiors was employed. To the 10 liter autoclave was charged 450 g (of a 20% w/w solution) sodium alkyl aryl polyethylene oxide sulfate (3 moles ethylene oxide), 50 g (of a 70% w/w solution in water) alkyl aryl polyethylene oxide (30 moles ethylene oxide), 90 g (of a 25% w/w solution in water) sodium vinyl sulfonate, 0.5 g sodium acetate, 5 g (of a 1% w/w solution in water) ferrous sulfate solution, 2 g sodium formaldehyde sulfoxylate and 1700 g water. After purging with nitrogen, all the vinyl acetate (3000 g) was added and the reactor was pressurized with ethylene to 700 psi and equilibrated at 50° C. for 15 min.

The polymerization was started by metering in a solution of 25 g t-butyl hydroperoxide in 200 g water and 25 g sodium formaldehyde sulfoxylate in 200 g water. The initiators were added at a uniform rate over 5 hrs.

Concurrently added with the initiator over 4 hrs. was an emulsified mix of 1000 g butyl acrylate, 135 acrylic acid, 2.5 g triallyl cyanurate with 90 g of N-methylol acrylamide (48% w/w solution in water), 300 g (of a 20% solution in water) sodium alkyl aryl polyethylene oxide sulfate (3 moles ethylene oxide), 70 g (of a 70% w/w solution in water) alkyl aryl polyethylene oxide (30 mole ethylene oxide) and 3.5 g sodium acetate in 220 g water.

During polymerization the temperature of the reaction was maintained at 60°-65° C. by means of cooling and at the end of the reaction the emulsion was transferred to an evacuated vessel (30 liter) to remove residual ethylene from the system.

This produced a composition of 65VA/15E/20BA/1NMA/3AA/0.05TAC. The emulsion polymer was provided at 60% solids, and had a $T_g$ of $-14°$ C., a pH of 4.3, a particle size of 0.26 microns and a viscosity of 340 cps at 20 RPM. The polymer provides a satisfactory caulk base and was identified as Caulk Base 15 in Table 1.

Using a procedure similar to that previously described another emulsion polymer was prepared from 70 parts vinyl acetate, 30 parts butyl acrylate, 15 parts ethylene, 1.7 parts methacrylic acid, 1.7 parts acrylic acid, 1.5 parts hydroxyethyl methacrylate and 0.08 parts triallylcyanurate. The emulsion polymer had a Tg of about $-20°$ C. and was produced at 60% solids. This emulsion also provides a satisfactory caulk base.

Using the basic procedure described above, a series of caulk bases were prepared and are identified by composition (parts by weight) In Table I below. The abbreviations used in Table I are as follows:

E = ethylene
VA = vinyl acetate
BA = butyl acrylate
MAA = methacrylic acid
2-EHA = 2-ethylhexyl acrylate
EA = ethyl acrylate
AA = acrylic acid
DBM = dibutyl maleate
NMA = N-methylol acrylamide
AM = acrylamide
TAC = triallyl cyanurate
HEA = hydroxyethyl acrylate The caulk bases were formulated into caulks using essentially the formulation described above. The caulks were then subjected to the following tests:

CAULK TENSILE PROPERTIES

Equipment a. "Instron" Tensile Tester.
b. Metal Template with inside dimensions three inches in diameter, six inches long and 1/16 inch deep.
c. "Teflon" coated steel plate.
d. A flat spatula.
e. A thin blade knife.

Procedure a. Place the Template on the "Teflon" coated steel plate.

b. Fill the Template with caulking compound and remove the excess with a flat spatula.
c. Run a thin knife blade around the inside edges of the Template to free the compound. Carefully remove the Template.
d. Allow the caulk to cure 7 days at 77° F. and 50% R.H.; followed by 14 days @ 120° F.
e. The "Instron" specimens are then cut to 3" length, 1" width.
f. The "Instron" Tensile Tester is then used to determine the tensile and elongation, with the following settings:

| | |
|---|---|
| Crosshead speed | 2.0 inch per minute |
| Gauge length | 0.5 inches |

ADHESION (Dry)

Equipment a. "Instron" Tensile Tester.
b. 1/16" wooden chims.
c. Substrates (as noted) free of foreign particles.
d. One-inch strip of desized, grade A airplane fabric (4.2 ounces per yard, 80/84 thread count).
e. Flat spatula, and razor blade.

Procedure a. The wooden shims are attached to the substrate parallel to each other and separated by slightly more than one inch.
b. The caulking compound is applied to the substrate with a spatula to the thickness of the shim, leaving a smooth surface. A 1 inch width strip of airplane fabric is pressed into the caulking compound surface. The fabric should be long enough to cover the length of the film at 180° F., and have enough left over to fit into the "Instron" jaws.
c. Additional caulking compound is applied over the fabric surface to uniformly cover the surface.
d. Allow the caulking compound to cure seven days at 77° F., 50% R.H., 14 days at 122° F. forced air oven, then recondition one day at room temperature.
e. The cured specimens of compound are then cut, along the outer edges of the fabric to the substrate, and the wooden shims are removed.
f. The specimen is then placed in the "Instron" Tensile Tester and the cloth is pulled back over on itself at 180° F. and fitted into the separation jaws.
g. The rate of separation of the jaws of the "Instron" Tester is maintained at two inches per minute, with a chart speed of one inch per minute. The values are recorded in pounds per inch.

Values of greater than about 5 pli are considered acceptable, particularly in the cases of cohesive (c) mode failure rather than adhesive (a) mode value.

Extrudability

Formulated caulking compound is forced under 50 psi pressure through a ⅛" orifice. The weight that extruded for a given period in time is recorded. The extrudability is reported in g/sec. Extrudability values of between about 1 to 10 g/sec. are preferred, with values of 1 to 15 g/sec. acceptable.

Weathering

I) QUV:
a. A (2½"×5 ½"×1/16") metal template with inside dimensions placed on an aluminum QUV panel.
b. The template is filled with caulking compound and the excess is removed with a flat spatula
c. The template is carefully removed using a thin blade knife.
d. The compound is aged 7 days at 77° F./50% R.H. followed by 14 days in a 120° F. forced air oven.
e. The QUV panel with compound is placed in QUV apparatus and subjected to weathering for 1000 hour;
f. The panels are removed and assessed for blistering, loss of adhesion and color change.
  Good—no blistering, or color changes.
  Fair—a few small blisters, or slight color change.
  Poor—many blisters or noticable change in color.
II) Cold Temperature Flexability (ASTM C 734-82)
a. A rectangular brass template with inside dimensions 5"×2 ½"×⅛" is placed on a t3 temper alclad aluminum panel.
b. The template is filled with caulking compound and the excess is removed with a flat spatula.
c. The template is carefully removed leaving the caulking compound.
d. The samples are conditioned for 2 days ⓐ 23° C.
e. The conditioned samples are placed in an artificial weathering unit (QUV) and cycled for 500 hours.
f. The samples are removed from the QUV and placed in a freezer at 0° F. for 4 hours along with a 1" metal mander.
g. While still in the freezer each sample is bent around the mandrel.
h. The caulking compound is examined for cracking or loss of adhesion.
  Pass means there were no cracks through to the substrate and no adhesion loss.
  Fail indicates there was cracking through to substrate and/or adhesion loss.

EXAMPLE II

As in Example I, a series of caulk bases were prepared and tested is described above. The compositions and testing are shown in Table II.

As the results of Tables I and II indicate, test results substantially equivalent to (and often better than) the results acheived using the conventional all-acrylic caulks can be obtained using the lower price ethylene containing caulk bases of the present invention.

It will be apparent that various changes and modifications may be made in the embodiments of the invention described above, without departing from the scope of the invention, as defined in the appended claims, and it is intended therefore, that all material contained in the foregoing description shall be interpreted as illustrative only and not as limitative of the invention.

TABLE I

| Base | Composition | Stress @ 100% Ext. PSI | Peak Stress PSI | Extension @ Peak Stress % | Glass Adhesion (Dry) PLI | Extrudability g/sec. |
|---|---|---|---|---|---|---|
| 1 | 15E/50VA/35BA/3MAA | 30 | 41 | 930 | 18 | N/T |
| 2 | 15E/50VA/35 2-EHA/3MAA | 24 | 33 | 890 | 15 | N/T |
| 3 | 15/E/50VA/35EA/3MAA | 34 | 45 | 1030 | 14 | N/T |
| 4 | 15E/65VA/20BA/3AA | 33 | 38 | 730 | 16 | 0.92 |
| 5 | 15E/42.5BA/42.5BA/3AA | 27 | 33 | 700 | 11 | 3.2 |
| 6 | 15E/65VA/20BA/3AA | 33 | 38 | 730 | 16 | 0.92 |
| 7 | 15E/65VA/17DBM/3AA | 23 | 24 | 380 | 12 | 0.37 |
| 8 | 15E/42.5VA/42.5BA/3AA | 27 | 33 | 700 | 16 | 3.2 |
| 9 | 15E/42.5VA/52.5BA/3MAA | 20 | 20 | 150 | 12 | 6.6 |
| 10 | 15E/42.5VA/42.5VA/3AA/1NMA | 33 | 50 | 680 | 12 | N/T |
| 11 | 15E/42.5VA/42.5BA/3MAA/1NMA | 27 | 40 | 620 | 9 | N/T |
| 12 | 15E/42.5VA/42.5BA/3MAA/1NMA/0.5AM | 30 | 53 | 600 | 8 | N/T |
| 13 | 15E/42.5VA/42.5BA/2MAA/2NMA | 26 | 47 | 790 | 14 | N/T |
| 14 | 15E/65VA/20BA/3AA/1NMA | 42 | 71 | 760 | 8 | N/T |
| 15 | 15E/65VA/20BA/3AA/1NMA/0.5TAC | 43 | 84 | 550 | 14 | N/T |
| 16 | 15E/65VA/20BA/3AA/0.15TAC | 50 | 78 | 500 | 5 | N/T |
| 17 | 15E/65VA/20BA/2.5AA/2NMA | 40 | 68 | 520 | 10 | N/T |
| 18 | 15E/65VA/20BA/2.5AA/2HEA | 42 | 68 | 640 | 6 | N/T |
| 19 | Control Commercial Acrylic | 47 | 89 | 500 | 17 | 0.41 |

N/T = not tested

TABLE II

| Base | Composition | QUV (1000 Hrs.) | Low Temperature Flexibility | Stress @ 100% Ext. PSI | Peak Stress PSI | Extension @ Peak Stress % | Wood PLI | Glass PLI | Aluminum PLI | Vinyl PLI |
|---|---|---|---|---|---|---|---|---|---|---|
| 20 | 15E/65VA/20BA/3.3AA/2.0NMA/.08TAC | Fair | Pass | 62 | 97 | 500 | 5.8 A | 12.0 C | 10.0 A | 10.0 C |
| 21 | 15E/65VA/20BA/3.3AA.2.0HPMA/.08TAC | Good | Pass | 36 | 70 | 860 | 8.5 C | 6.0 A | 10.0 A | 11.0 C |
| 22 | 15E/65VA/20BA/3.3MAA/2.0NMA/.08TAC | Good | Pass | 39 | 74 | 760 | 11.5 A | 7.5 A | 10.0 A | 11.5 C |
| 23 | 15E/65VA/20BA/3.3MAA/0.5TAC | V. Good | Fail | 45 | 69 | 520 | 6.0 A | 8.0 A | 8.0 A | 9.5 C |
| 24 | 15E/65VA/20BA/3.5MAA/0.25Vinyl Silane | Good | Fail | 39 | 65 | 520 | 9.5 A | 16.5 C | 12.5 A | 15.0 C |
| 25 | All Acrylic Control | Good | Pass | 47 | 89 | 500 | 12.4 A | 17.5 A | 18.5 A | 11.0 A |

We claim:

1. Latex caulk compositions comprising 30 to 80% of a filler selected from the group consisting of calcium carbonate, mica, talc, diatomaceous earth, barytes, alumina, slate flour, calcium silicate, clay, colloidal silica, magnesium carbonate and magnesium silicate and 20 to 70% by weight of a polymer prepared by emulsion polymerization techniques, said polymer comprising 30 to 70 parts by weight of a vinyl ester of an alkanoic acid; 15 to 60 parts by weight of an alkyl ($C_2$ to $C_8$) acrylate or dialkyl ($C_2$ to $C_{10}$) maleate; 10 to 30 parts by weight ethylene; 1 to 5 parts by weight of an olefinically unsaturated mono-or dicarboxylic acid; 0 to 5 parts by weight of a multi-functional monomer selected from the group consisting of a lower alkenyl lower alkenoates; di-lower alkenyl alkanedioates, di-lower alkylene bisacrylamides and lower alkylene bis-methacrylamides, and triallyl cyanurate; and 0 to 8 parts by weight of a copolymerizable functional monomer containing hydroxyl, amide or methylol substituents, (to total 100 parts by weight).

2. The caulk of claim 1 wherein the vinyl ester is vinyl acetate.

3. The caulk of claim 1 wherein the vinyl ester is present in an amount of 50 to 60% by weight of the polymer.

4. The caulk of claim 1 wherein the alkyl($C_2$ to $C_8$) acrylate or dialkyl ($C_2$ to $C_{10}$) maleate component is present in an amount of 25 to 40% weight.

5. The caulk of claim 1 wherein the olefinically-unsaturated carboxylic acid is selected from the group consisting of acrylic acid, meth-acrylic acid, crotonic acid, itaconic acid, maleic acid or fumaric acid, or mixtures thereof.

6. The caulk of claim 1 wherein there is present a monomer selected from the group consisting of vinyl crotonate, allyl acrylate, allyl methacrylate, diallyl maleate, divinyl adipate, diallyl adipate, diallyl phthalate, ethylene glycol diacrylate, ethylene glycol dimethacrylate, butanediol dimethacrylate, methylene bis-acrylamide and triallyl cyanurate.

7. The caulk of claim 1 wherein there is also present in the polymer a copolymerizable comonomer selected from the group consisting of methacrylamide, acrylamide, hydroxyalkyl ($C_2$–$C_4$) acrylates or methacrylates.

8. The caulk of claim 1 wherein the polymer has a glass transition temperature of −40° to 0° C.

9. The caulk of claim 1 wherein the polymer has a glass transition temperature of −30° to 10° C.

10. The caulk of claim 1 containing, in addition to the filler and emulsion polymer at least one member selected from the group consisting of pigments, plasticizers, free-thaw stabilizers, drying oils, pigment dispersants, solvents, anti-bacterial or anti-fungal preservatives, thickeners and anti-slump agents.

11. The caulk of claim 1 wherein there is present in the polymer 1 to 8 parts by weight of N-methylol acrylamide.

* * * * *